Oct. 21, 1969    H. KREIDEL, SR., ET AL    3,473,832
BALL-BEARING SWIVEL JOINT FOR FLUID CONDUITS
Filed Aug. 11, 1967
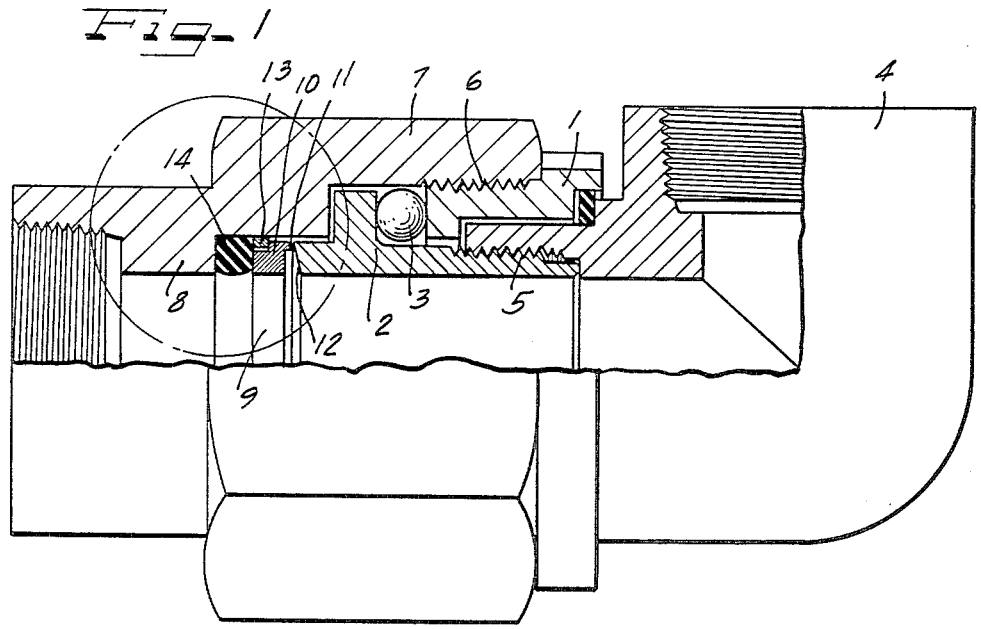
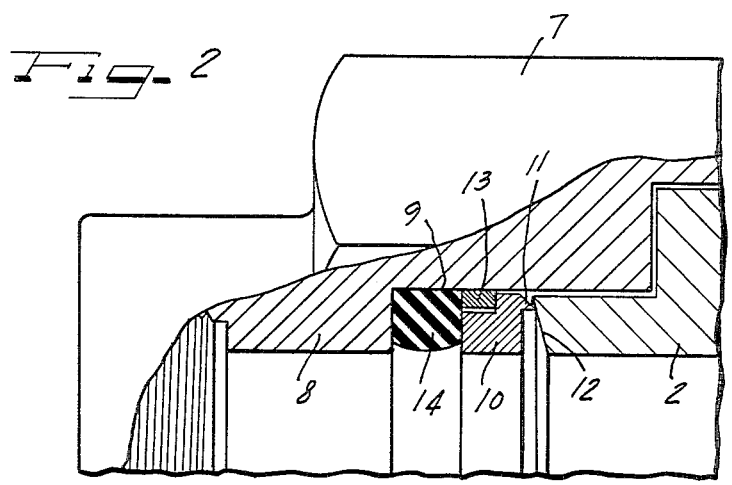
INVENTORS
HANS KREIDEL SR.
HANS KREIDEL
BY    ATTORNEYS United States Patent Office 3,473,832
Patented Oct. 21, 1969

3,473,832
BALL-BEARING SWIVEL JOINT FOR
FLUID CONDUITS
Hans Kreidel, Sr., and Hans Kreidel, Wiesbaden, Germany, assignors to Inventex GmbH, Baden (Aargau), Switzerland, a corporation of Switzerland
Filed Aug. 11, 1967, Ser. No. 660,082
Int. Cl. F16l *17/00*
U.S. Cl. 285—98        2 Claims

ABSTRACT OF THE DISCLOSURE

A ball-bearing swivel joint for fluid conduits, having first and second tubular connecting structures which are constructed for connection to respective elements of a line in which the joint is to be inserted, with one end of the first structure being concentrically disposed within an end of the second structure and rotatable relative thereto, such structure having opposed radially extending bearing races disposed to oppose separating movement between the two connecting structures, and having a plurality of bearing balls disposed between the two connecting structures, with the inner end of the inner connecting structure having a hard, smooth annular surface forming one end of an annular sealing chamber defined thereby and the other connecting structure, an annular sealing member disposed in said chamber, formed from a non-compressible material having a low coefficient of friction, and having an annularly-shaped portion at one end bearing in sealing relation on said inner end surface of said inner connecting structure, radially extending annular shaped means, encircling in spaced relation a collar portion formed on said sealing member, having its outer peripheral edge bearing on the adjacent wall of said chamber and an end edge bearing on the end face of said sealing member adjacent said collar, and an elastic annular member engageable with the djacent end of said sealing member and the said second connecting structure for exerting an auxiliary force on said sealing member to maintain it in sealing relation irrespective of operative internal fluid pressure within the joint.

---

The invention is directed to a ball-bearing swivel joint for fluid conduits of the general type illustrated in our copending application Ser. No. 353,326, now U.S. Patent No. 3,339,946, and is an improvement thereof. The prior joint structure above referred to employs two relatively rotatable connecting structures having a ball-bearing connection therebetween and utilizes a solid ring-shaped sealing element of non-compressible material having a low coefficient of friction, which is disposed in a chamber formed by the connecting structures. Such sealing ring is provided with an annularly-shaped end portion forming an edge which bears, in sealing relation, on a hard, smooth annular surface of the cooperable connecting structure, with the sealing ring being urged into engagement with such surface by a compressions spring bearing upon the opposite end of the sealing ring. Such edge forms the seal in an axial direction while the sealing in a radial direction is affected by a ring-shaped sealing element of elastic material disposed in an external peripheral groove in the sealing ring.

It has been demonstrated that the seal can fail, especially at high pressures, if the ring-shaped sealing element of elastic material is deformed or pressed into the crack between the outer diameter of the sealing ring and the inner cylindrical wall of the chamber and destroyed through excessive wear. As a result, the sealing ring may be simultaneously jammed and blocked, resulting in leakage and a failure of the swivel joint.

In order to prevent dirt present in the liquid media, especially in hydraulic oil, often in the form of very small metal shavings, from reaching the location of the sealing contact between the sealing ring and cooperable surface of the adjacent connecting structure, which dirt leads to leakage and premature wear thereat, dirt traps or retainers were provided, which involved considerable expense.

The object of the present invention is to eliminate the disadvantages referred to and at the time to lengthen the life of the swivel joint, as well as achieve a considerably lower production cost, and to assure complete safety of operation even at high maximum pressures.

For the solution of this problem it is suggested, in accordance with the invention, to effect, on the one hand, the static seal of the sealing ring in the chamber, and on the other hand apply pressure to the sealing edge of the sealing ring on the cooperable hard, smooth surface of the associated connecting structure by means of a ring-shaped member of elastic material which fills the free space of the chamber behind the sealing ring formed by the cooperable connecting structures, and thus initially stress the sealing ring. In addition there is provided an intermediate ring of non-compressible material which closely bears upon the inner wall of such chamber such intermediate ring encircling a collar formed on the sealing ring but spaced therefrom to provide suitable clearance and bears upon the adjacent transversely extending wall of the sealing ring. The intermediate ring has a length, in axial direction, which corresponds to the axial length of the collar it encircles so that the rear or free edge of the sealing ring and corresponding edge of the intermediate ring are in substantial alignment, thus not effecting the radial clearance of the sealing ring. The intermediate ring prevents the movement or flow of the elastic ring, under pressure, into the space between the chamber wall and the adjacent surface of the sealing ring and thus prevents wear on the former. The utilization of a lip-shaped formation of the sealing edge at the front end of the sealing ring additionally serves as a dirt guard, rendering unnecessary the use of specific supplemental dirt catchers or filters.

In the drawings, illustrating an embodiment of the invention, wherein like reference characters indicate like of corresponding parts and in which:

FIG. 1, is a side elevational view, with portions broken away in longitudinal section, of a swivel joint assembly constructed in accordance with the invention; and FIG. 2, is an enlarged sectional view of the area of FIG. 1 defined therein by a dot dash circular line.

Referring to FIG. 1, the ball bearing swivel joint therein illustrated comprises a ring-shaped bearing member 1 cooperable with a bearing member 2 forming respective bearing races between which are disposed a plurality of bearing balls 3. Secured to the member 2 is an angular pipe coupling 4, the latter and the member 2 being provided with cooperable threads 5 by means of which the two may be tightly screwed together to form a unitary connecting structure. In like manner secured to the member 1 is secured to a line connecting member 7 by means of cooperable threads 6 to form a second unitary connecting structure, with the two such connecting structures being rotatable relative to one another on the ball bearing so formed. The seal between the two connecting structures is disposed in a cylindrical portion 8 of the member 7 in a chamber 9 defined by the two connecting structures, and the invention is directed to the sealing structure thereat. Disposed in the chamber 9, similar to that illustrated in the above referred to application, is a sealing ring 10 which is provided with radial clearance, the ring having a sealing edge 11 at one end thereof which is engageable with the hard, smooth end face 12 of the bearing member 2, which end face is illustrated as being beveled or tapered towards the interior. The outer periphery of the sealing ring 10, adjacent the opposite end thereof is cut away to form a collar portion and encircled by an intermediate ring member 13 which is disposed to closely bear on the inner wall of the chamber 9 with one end face abutting the adjacent end face of the sealing ring defining the axial length of such collar portion and its opposite end face being in substantial alignment with the rear end face of the sealing ring which thus defines the rear end of such a collar. Disposed in the chamber 9 between the adjacent end faces of the sealing and intermediate rings at the one side of the chamber and the portion 8 defining the rear end wall of the chamber 9 an elastic ring-shaped member 14 which in its initial pre-stressed state fills such portion of the chamber and bears on the end wall thereof, on the adjacent circumferentially extending wall of the chamber and on the adjacent end walls of the sealing ring 10 and the intermediate ring 13. The ring member 14 exerts a slight pressure on the sealing ring 10 to insure the continuous engagement of the sealing edge 11 with the face 12 of the member 2, and thus effects an efficient sealing in axial direction, while the intermediate ring 13 provides an effective sealing in radial direction without imparing the clearance between the sealing ring 10 and the intermediate ring 13, thereby permitting any necessary movement of the sealing ring 10 with respect to the face of the member 2, to assure the adjustment and the proper seating of the ring end with respect to the slightly tapered face 12.

In the embodiment of the invention illustrated, as will be apparent from a reference to FIG. 2, the sealing edge 11 is defined in cross-section by an angularly extending outer wall or surface and an inner wall or surface which extends parallel to the axis of rotation, to form a relatively sharp angle between such walls. This construction discourages the entrance of dirt in the transmission medium from entering the seal at such sealing edge and insures a positive and leak proof construction for the transmission of a fluid medium in which the sealing structure has a long life span.

We claim:
1. In a ball-bearing swivel joint for fluid conduits, having first and second tubular connecting structures which are constructed for connection to respective elements of a line in which the joint is to be inserted, with one end of the first structure being concentrically disposed within an end of the second structure and rotatable relative thereto, each of said connecting structures having a radially extending bearing surface, said surface coacting to define a pair of opposed bearing races, a plurality of bearing balls disposed between said connecting structures and in engagement with said opposed bearing races, means for joining said first and second connecting structures, said first connecting structure having at an inner end a hard, smooth annular surface forming one end of an annular sealing chamber defined by said annular surface and the other connecting structure, the improvement comprising an annular sealing member disposed in said chamber, said member being formed from a non-compressible material having a low coefficient of friction and having an angularly-shaped portion at one end bearing in sealing relation on said annular surface of said first connecting structure, said sealing member having a collar portion on the other end, a radially extending annular shaped intermediate ring encircling in radially spaced relation to said collar portion of said sealing member and having its outer peripheral edge bearing on the adjacent wall of said chamber and an end edge bearing on the end face of said sealing member adjacent said collar, said collar portion and said intermediate ring having substantially like dimensions in an axial direction, and an elastic annular-shaped member engageable with said second connecting structure and the adjacent end of said sealing member and the adjacent face of the intermediate ring for exerting an auxiliary force on said sealing member and said intermediate ring to maintain said sealing member in sealing relation with said annular surface irrespective of operative internal fluid pressure within the joint.

2. A ball-bearing swivel joint according to claim 1, wherein said portion of the sealing member bearing on said hard, smooth annular surface is defined by surfaces which in radial cross-section extend at an angle to one another with the inner surface extending parallel to the axis of rotation and the outer surface extending at an acute angle thereto.

References Cited
UNITED STATES PATENTS

| | | | |
|---|---|---|---|
| 2,407,745 | 9/1946 | Jacobson | 285—278 |
| 2,421,974 | 6/1947 | Vandervoort | 285—281 X |
| 2,509,118 | 5/1950 | Warren | 285—276 |
| 2,498,915 | 2/1950 | Espegren | 285—274 |
| 2,723,136 | 11/1955 | Deubler | 285—276 |
| 3,168,250 | 2/1965 | Paasche | 285—276 X |
| 3,339,946 | 9/1967 | Kreidel et al. | 285—272 |
| 3,372,948 | 3/1968 | Arneson | 285—98 |

THOMAS F. CALLAGHAN, Primary Examiner

U.S. Cl. X.R.

285—281